US006867577B2

United States Patent
Kerger et al.

(10) Patent No.: US 6,867,577 B2
(45) Date of Patent: Mar. 15, 2005

(54) DIFFERENTIAL PROTECTIVE METHOD TO GENERATE AN ERROR SIGNAL CHARACTERISTIC OF A FAULT CURRENT

(75) Inventors: Torsten Kerger, Berlin (DE); Yves Ngounou Ngambo, Luik (BE); Luc Philippot, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 98 days.

(21) Appl. No.: 10/149,019

(22) PCT Filed: Dec. 6, 2000

(86) PCT No.: PCT/DE00/04384

§ 371 (c)(1),
(2), (4) Date: Oct. 15, 2002

(87) PCT Pub. No.: WO01/43257

PCT Pub. Date: Jun. 14, 2001

(65) Prior Publication Data

US 2003/0058594 A1 Mar. 27, 2003

(30) Foreign Application Priority Data

Dec. 7, 1999 (DE) .......................................... 199 59 793

(51) Int. Cl.$^7$ ............................................. G01R 31/08
(52) U.S. Cl. .................... 324/117 R; 324/126; 324/127
(58) Field of Search .......................... 324/117 R–117 H, 324/522, 126–127, 133; 361/91–94; 340/870.17; 702/64

(56) References Cited

U.S. PATENT DOCUMENTS

| | | | |
|---|---|---|---|
| 4,939,617 A | | 7/1990 | Hoffman et al. |
| 5,077,520 A | * | 12/1991 | Schweitzer, Jr. ............. 324/133 |
| 5,206,596 A | * | 4/1993 | Beihoff et al. ............... 324/536 |
| 5,565,783 A | * | 10/1996 | Lau et al. .................... 324/522 |

OTHER PUBLICATIONS

0885–8977/92, "Charge Comparison Protection of Transmission Lines—Relaying Concepts"; by Leonard J,Ernst et al.; IEEE Transactions on Power Delivery, vol. 7, No. 4, c. 1992.

\* cited by examiner

Primary Examiner—Vinh P Nguyen
(74) Attorney, Agent, or Firm—Morrison & Foerster LLP

(57) ABSTRACT

The invention relates to a method for generating an error signal which characterizes a fault current in an electrical conductor provided with two conductor ends and having charge measuring devices which are connected to each other by data lines. At least one device is attached to each end of the conductor. In the inventive method, charge measuring values are determined using charge measuring devices. The measured charge values take into account the direction of the charge flow a total measured charge value is formed by addition. The error signal is generated when the total measured charge value exceeds a certain threshold value. According to the invention, the measured charge values are determined synchronously and determined repeatedly at regular intervals in such a way that the time interval between each sequential determination is smaller than the predefined measuring period.

8 Claims, 3 Drawing Sheets

DIFFERENTIAL PROTECTIVE METHOD TO GENERATE AN ERROR SIGNAL CHARACTERISTIC OF A FAULT CURRENT

CLAIM FOR PRIORITY

This application claims priority to International Application No. PCT/DE00/04384 which was published in the German language on Jun. 14, 2001.

TECHNICAL FIELD OF THE INVENTION

The invention relates to a method for generating an error signal, and in particular, to generating an error signal that characterizes a fault current in an electric conductor.

BACKGROUND OF THE INVENTION

Such a method is known from the printed publication "Charge comparison protection of transmission lines—relaying concepts" (Ernst, Hinman, Quan, Thorp; IEEE Transaction on Power Delivery, Vol. 7, No. 4, October 1992, pages 1834 to 1846). In this previously known method, the respective current is sampled at each end of a conductor, current samples being formed. The samples are picked up in this case at a time interval of 0.5 ms. The samples thereby produced are integrated individually at the conductor ends with the formation of measured charge values, the integration period corresponding to half a cycle length of the current—there being an alternating current with a fundamental frequency of 60 Hz in the previously known method. The integration intervals always start and end in this case with zero crossings of the alternating current measured at the respective conductor end. The measured charge values formed in this way are summed, specifically, on the one hand, with the formation of a scalar sum ("sum of absolute magnitudes"), by summing the measured charge values without taking account of the respective signs —that is without taking account of the flow of charge —and, on the other hand, with the formation of an arithmetic sum ("absolute magnitude of the sum of the signed magnitudes")—termed total measured part value below—by virtue of the fact that the measured charged values are summed taking account of the respective sign. The error signal is generated whenever the total measured charge value (arithmetic sum) exceeds a threshold value dependent on the scalar sum, that is adapted to the respective measuring situation.

Furthermore, such a method is disclosed in U.S. Pat. No. 4,939,617. In this method, an error signal is generated upon the occurrence of an internal error on a power transmission line. For this purpose, measured current values are detected at both ends of the conductor, and these are integrated over a duration of half a cycle. The measured charge values detected in this way are transmitted via a communication line between the charge measuring devices in both directions, that is both from the first charge measuring instrument to the second charge measuring device, and vice versa. A tripping value ("restraint value") is formed in evaluation devices assigned to the respective measuring instruments as the sum of the measured charge value of the first measuring instrument and the measured charge value of the second measuring instrument, by adding the measured values without taking account of their respective signs. Moreover, a reference value ("operate value") is formed as a sum by adding the two measured charge values with the correct signs. This operate value is multiplied by a factor, for example 3, a weighted reference value being formed. An error signal specifying an internal fault on the power transmission line is generated whenever the operate value assumes a value that is greater than the restraint value.

SUMMARY OF THE INVENTION

The invention relates to a method for generating an error signal that characterizes a fault current in an electric conductor having at least two conductor ends, and conducting an alternating current and having charge measuring devices that are connected to one another via data lines, and of which respectively one is fitted at each end of the conductor, in which method the charge measuring devices are used to measure measured charge values that in each case specify the charge quantity flowing through the respective conductor end during a prescribed measuring period, a total measured charge value is formed by addition with the aid of the measured charge values taking account of the direction of the flow of charge, and the error signal is generated when the total measured charge value exceeds in absolute terms threshold value set as a function of the respective magnitude of the alternating current.

The invention discloses a method that detects errors more reliably than in the prior art.

In one embodiment of the invention, the measurement of the measured charge values is carried out in a time-synchronized fashion and is repeated regularly such that the time interval between two sequential measurements is smaller in each case than the prescribed measuring period.

An advantage of the method according to the invention is that it can be used to detect errors in a particularly reliable fashion. By contrast with the previously known method, the measurements of the measured charge values are carried out not separately one after another, but in a temporally overlapping fashion. The result of this is that substantially more measured charge values are detected per period, and thus there is a much larger "database" available for error detection than heretofore. This may be illustrated with the aid of a numerical example: in the previously known methods, the measured charge values are always formed with reference to the length of half a period, such that —per period —a maximum of two measured charge values per conductor end are available for evaluation. By contrast, in the case of the method according to the invention the measured charge values are formed with the aid of temporally overlapping measuring windows by which any desired number of measured charge values may be formed, depending on the degree of the prescribed overlap. This leads overall to a larger quantity of data or database that can be evaluated, and thus to a higher reliability in the formation of the error signal.

In one aspect of the invention, if the measured charge values are formed by integration of measured current variables (in analog or digital terms), which have been generated with the aid of current transformers, measuring errors can arise owing to current transformer saturation. In order to avoid measuring errors owing to current transformer saturation, it is advantageous when the prescribed measuring period —that is, the measuring window for the measurement of the charge quantities —is significantly shorter than half the current cycle length, so that, if appropriate, the error signal can be generated before the current transformers go into saturation. According to the invention, the prescribed measuring period corresponds approximately to a quarter of the current cycle length. Such a length of measuring window is long enough in order to obtain measured charge values that can be evaluated effectively and, in turn, short enough to be able to generate the measuring signal reliably before the onset of current transformer saturation.

In one aspect of the invention, it is advantageous if the time interval between two temporally partially overlapping measurements is approximately half as long as the prescribed measuring period (same length of the measuring window). This means in the case of a measuring-window length that corresponds to a quarter of the cycle length of the current that approximately 8 measured charge values are generated per period, as a result of which a satisfactory reliability is achieved in the formation of the error signal.

The formation of the measured charge values can be performed in this case in a particularly simple way by analog integration of analog current signals or by digital integration of digital measured current values.

In another aspect of the invention, if the total measured charge value is formed in one of the charge measuring devices, that is in a selected charge measuring device, it is advantageous when in the case of a conductor having at least three conductor ends there is transmitted to the selected charge measuring device an intermediate value that is formed by addition in advance from the measured charge values of the remaining charge measuring devices and the total measured charge value is formed by addition with the aid of the measured charge value of the selected charge measuring device and with the aid of the intermediate value. In accordance with this embodiment, throughput is saved because with reference to the selected charge measuring device there is no need to transmit the measured charge values of all remaining charge measuring devices —that is a multiplicity of measured values —but only a single measured value, specifically the intermediate value.

Alternatively, it is advantageous when in the case of a conductor with at least three conductor ends two intermediate values are transmitted to the selected charge measuring device. A first intermediate value, which is formed by addition from the measured charge values of a first group of the remaining charge measuring devices, and a second intermediate value, which is formed by addition from the measured charge values of a second group of the remaining charge measuring devices. The second group including charge measuring devices apart from the selected charge measuring device and the charge measuring devices of the first group, the total measured charge value is formed by addition with the aid of the measured charge value of the selected charge measuring device and two intermediate values. This alternative embodiment of the method according to the invention can be used with particular advantage however, when, for the purpose of data exchange, the charge measuring devices are connected to one another by a data line with the formation of a "chain", and the selected charge measuring device is an inner chain link of this chain thus formed.

BRIEF DESCRIPTION OF THE DRAWINGS

In order to explain the invention.

DETAILED DESCRIPTION OF THE PREFERRED EMBODIMENTS

Figure 1:
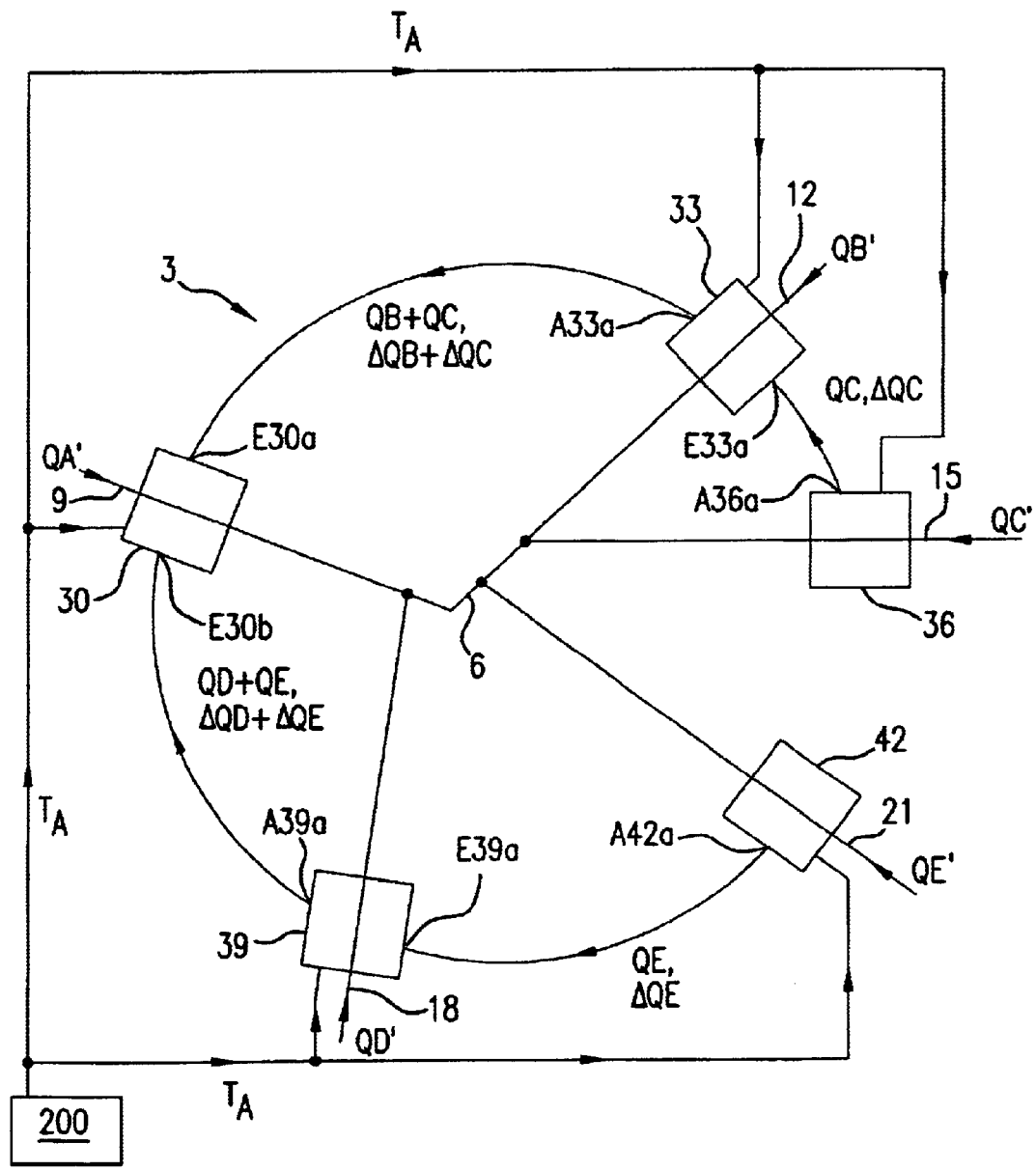
FIG. 1 shows an exemplary embodiment of an arrangement for carrying out the method according to the invention.

FIG. 1 shows an arrangement 3 for monitoring an electric conductor 6 for a fault current. The electric conductor 6 has a total of five conductor ends, specifically a first conductor end 9, a second conductor end 12, a third conductor end 15, a fourth conductor end 18 and a fifth conductor end 21. At each of the conductor ends 9, 12, 15, 18 and 21 in each case is a charge measuring device, the charge measuring devices being connected to one another via data lines—for example optical glass fibers. In this case, the first conductor end 9 is connected to a selected first charge measuring device 30, and a further charge measuring device 33, 36, 39 and 42 is respectively connected to the remaining conductor ends 12, 15, 18 and 21.

The first charge measuring device 30 is connected with your measured value input E30$a$ to a measured value output A33$a$ of the first further charge measuring device 33—denoted below for short as second charge measuring device 33. Arranged with your measured value output A36$a$ upstream of the latter at a measured value input E33$a$ is the second of the further charge measuring devices 36—designated below for short as third charge measuring device 36.

Furthermore, the first charge measuring device 30 is connected with a further measured value input E30$b$ to a measured value output A39$a$ of the third of the further charge measuring devices 39—designated below for short as fourth charge measuring device 39. Arranged with your measured value output A42$a$ upstream of the latter at a measured value input E39$a$ is the fourth of the further charge measuring devices 42—designated below for short as fifth charge measuring device 42.

The five charge measuring devices 30, 33, 36, 39 and 42 are therefore connected to one another in a chain-shaped structure, the third charge measuring device 36 and the fifth charge measuring device 42 in the chain forming outlying charge measuring devices, and the first charge measuring device 30, the second charge measuring device 33 and the fourth charge measuring device 39 in the chain forming internal charge measuring devices.

The arrangement 3 is used to monitor the electric conductor 6 for a fault current in the way described below.

A clock signal $T_A$ is transmitted to the charge measuring devices with the aid of a clock generator 200. This clock signal $T_A$ ensures that the charge measuring devices in each case determine the charge quantity flowing through their respective conductor end during a prescribed measuring period in a time-synchronous fashion, that is at the same instant.

After the charge measuring devices have now measured at one instant the charge quantities or charges QA', . . . , QE' at their respective conductor ends 9, 12, 15, 18, 21, the procedure is as follows:

The measured charge value IC, corresponding to the charge QC' at the conductor end 15, of the third charge measuring device 36 is output at the measured value output A36$a$ of the third charge measuring device 36 and transmitted to the measured value input E33$a$ of the second charge measuring device 33. This second charge measuring device 33 adds to the measured charge value QB corresponding to the charge QB' flowing through its conductor end 12 the measured charge value QC transmitted by the third charge measuring device 36, this being done with the aid of an arithmetic unit (not illustrated in FIG. 1) with the formation of an aggregate measured charge value QC+QB. This aggregate measured charge value QC+QB is transmitted from the second charge measuring device 33 to the first charge measuring device 30.

The fifth charge measuring device 42 at the fifth conductor end 21, and the fourth charge measuring device 39 at the fourth conductor end 18 operate exactly like the second and the third charge measuring devices, that is in each case they add with the correct sign the measured charge value of their own charge measuring device to a measured charge value, present at their measured value input, of the charge measuring device, possibly respectively connected upstream, while taking account of the respective direction of the flow of charge, and output the resulting aggregate measured charge value as measured value at their measured value output.

Consequently, a first intermediate value, which includes of the measured charge values QB and QC, passes to one measured value input E30a of the first charge measuring device 30, and a second intermediate value, which includes the measured charge values QE and QD, passes to the further measured value input E30b of the first charge measuring device 30.

Thereupon, a total measured charge value is formed in the first charge measuring device 30 by adding the first and the second intermediate values and the measured charge value QA specifying the charge QA' at the conductor end 9; this total measured charge value is equal to QA+QB+QC+QD+QE.

The total measured charge value QA+QB+ . . . +QE is zero in accordance with Kirchhoff's law when no fault current has occurred. If the total measured charge value is not zero or if it exceeds a prescribed threshold value, then a fault current has occurred. In this case, a fault current is understood to be a current which flows off from the line 6 or is fed into the line 6 at a fault location, for example a short circuit location, that is not at one of the conductor ends 9, 12, 15, 18, or 21. Both types of fault currents are reflected in the total measured charge value of the charge measuring device 30, and this can be established by comparing the total measured charge value with a threshold value that is approximately zero. An error signal is generated by the charge measuring device 30 if the total measured charge value exceeds the prescribed threshold value.

Thus, the selected first charge measuring device 30 uses the total measured charge value to establish whether an error current has occurred by comparison with the threshold value. It is possible in this case, for example, to establish in a DC system not only whether a fault has occurred, but also what type of fault when the respective sign of the total measured charge value is further evaluated, after the absolute value of the total measured charge value has been compared with the prescribed threshold value. Specifically, the sign indicates —depending on its assignment to a current direction —whether the error current has flowed into or out of the line 6.

The threshold value with which the total measured charge value QA+ . . . QE is compared, can be permanently prescribed, for example. In order, however, to be able to generate error signals in a particularly reliable fashion, it is preferable when the threshold value is automatically adapted to the respective "measuring situation". This can be achieved by individually adapting the threshold value of a conductor end to the accuracy of the charge measuring devices (in particular, including the assigned current transformer). The aim is therefore to form the error signal when the total measured charge value QA+ . . . QE is greater than a permanently prescribed minimum threshold Qmin and greater than a total system error $\Delta$Qdiff. The term total system error is understood to be an error that is formed by an estimate of the maximum possible measuring error of the overall measuring arrangement. The total system error $\Delta$Qdiff is to be formed in this case in accordance with $$\Delta Qdiff = \sum_{\substack{all\ charge \\ measuring \\ devices}} \Delta Qdiff_{\substack{total\ error \\ of\ the\ respective \\ charge\ measuring \\ device}} + \sum_{all\ connections} \Delta Qdiff_{synchronization}$$

The component $\Delta\Delta$Qdiff$_{synchronization}$ takes account in this case of synchronization errors in the synchronization of the charge measuring devices. Such errors occur whenever the measured charge values are not measured time-synchronously. The component $\Delta$Qdiff$_{total\ error\ of\ the\ respective\ charge\ measuring\ device}$ specifies the measuring error of the respective charge measuring device. This measuring error $\Delta$Qdiff$_{total\ error\ of\ the\ respective\ charge\ measuring\ device}$ is composed, in turn, of two components, specifically:

$$QQdif_{\substack{total\ error\ of \\ the\ respective \\ charge\ measuring \\ device}} = QQdif_{\substack{measuring \\ error}} + QQdif_{integration}$$

with $$\Delta Qdiff_{measuring\ error} = k \cdot T \frac{MAX}{measuring\ interval} \left[ \frac{|i|}{I_{nominal}} \right],$$

k being a parameter specifying the measuring inaccuracy (tolerance) of the respective charge measuring device, T denoting the length of the measuring interval (measuring window) during the charge measurement, and $$\frac{MAX}{measuring\ interval} \left[ \frac{|i|}{I_{nominal}} \right]$$

specifying the maximum current value in the measuring interval referred to the nominal current I$_{nominal}$ (normalized). $\Delta$Qdiff$_{measuring\ error}$ in this case therefore denotes the fraction of the total error of the respective charge measuring device that originates from the measuring inaccuracy k during the current measurement. This fraction increases with rising current as a function of the individual measuring inaccuracy k of the respective charge measuring device.

The component $\Delta$Qdiff$_{integration}$ as a fraction of the total error of the respective charge measuring device takes account of the integration error occurring depending on the integration method, which error can, in turn, differ individually with the charge measuring device. The component $\Delta$Qdiff$_{integration}$ is relevant when the measured charge values are obtained by integration from measured current values.

To be able to form the total system error $\Delta$Qdiff in the charge measuring device 30, the "measuring error" $\Delta$Qdiff$_{measuring\ error}$+$\Delta$Qdiff$_{integration}$ is determined, which is individual for each charge measuring device, and to transmit it to the charge measuring device 30. How this is done is now to be explained below. The following abbreviations are introduced for this purpose:

$\Delta QA = \Delta Qdiff_{\text{measuring error of the charge measuring device 30}} + \Delta Qdiff_{\text{integration error of the charge measuring device 30}}$ $\Delta QA = \Delta Qdiff_{\text{measuring error of the charge measuring device 30}} + \Delta Qdiff_{\text{integration error of the charge measuring device 33}}$ $\Delta QA = \Delta Qdiff_{\text{measuring error of the charge measuring device 30}} + \Delta Qdiff_{\text{integration error of the charge measuring device 36}}$ $\Delta QA = \Delta Qdiff_{\text{measuring error of the charge measuring device 30}} + \Delta Qdiff_{\text{integration error of the charge measuring device 39}}$ $\Delta QA = \Delta Qdiff_{\text{measuring error of the charge measuring device 30}} + \Delta Qdiff_{\text{integration error of the charge measuring device 42}}$ Thus, in addition to the respective measured charge value QA, QB, . . . QD the respective measuring errors ΔQA, ΔQB, ΔQC, ΔQD and ΔQE are likewise now formed in each of the charge measuring instruments in accordance with the above stipulations, and treated in each case exactly as the respective measured charge value. This means that the third charge measuring device 36 transmits its measuring error ΔQC to the second charge measuring device 33. The latter adds its own measuring error ΔQB to the received measuring error ΔQC, and transmits the aggregate measuring error ΔQB+ΔQC to the first charge measuring device 30. In the same way, the first charge measuring device 30 receives the aggregate measuring error ΔQD+ΔQE of the measuring errors of the fourth and fifth charge measuring devices 39 and 42.

The "total measuring error" $\Delta Q_{total}$ can be formed in the first charge measuring device 30 in accordance with $\Delta Q_{total} = \Delta QA + \Delta QB + \Delta QC + \Delta QD + \Delta QE$ In order to form the total system error $\Delta Q_{diff}$, it is then necessary to add the synchronization error to the total measuring error $\Delta Q_{total}$ in accordance with:

$$\Delta Qdiff = \Delta Qtotal + \sum_{\text{all connections}} \Delta Qdiff_{\text{synchronization}}.$$

Figure 3:
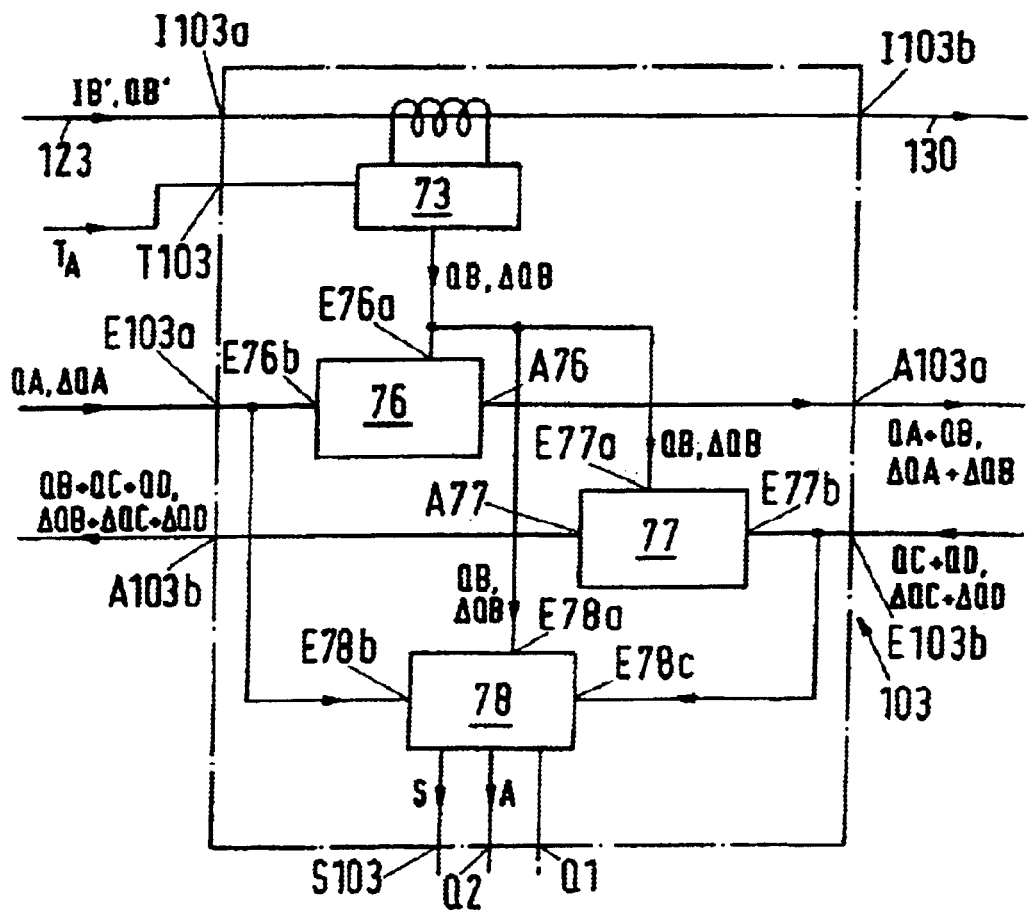
FIG. 3 shows an exemplary embodiment of a charge measuring device for carrying out the method according to the invention.

The calculation of the synchronization error is explained in conjunction with FIG. 3.

If the total system error $\Delta Q_{diff}$ in the first charge measuring device 30 is to hand, the total measured charge value QA+ . . . QE is compared with a prescribed minimum threshold value $Q_{min}$ and with the total system error $\Delta Q_{diff}$, and the error signal is generated when it holds that:

$QA+ \ldots QE > Q_{min}$ and $QA+ \ldots QE > \Delta Q_{diff}$

Figure 2:
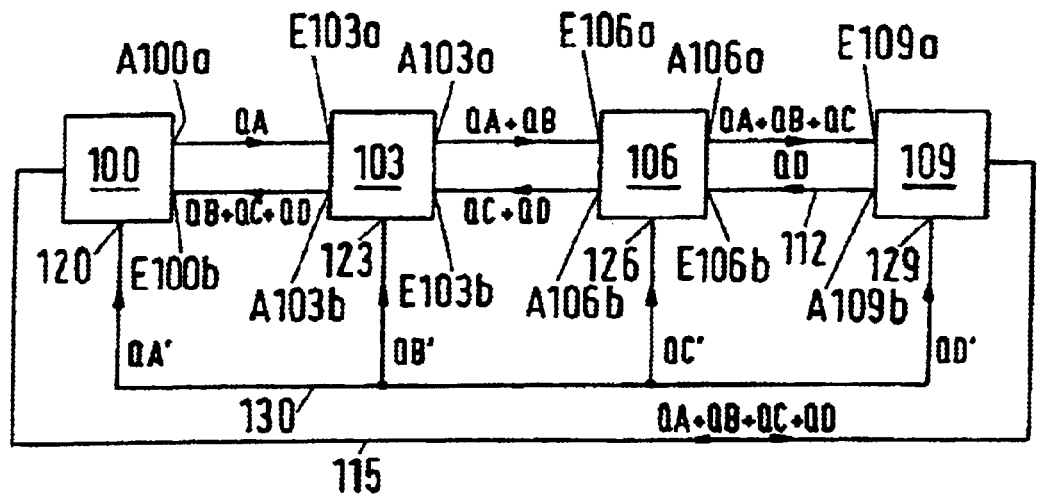
FIG. 2 shows an exemplary embodiment of an arrangement for carrying out the method according to the invention.

FIG. 2 shows a second exemplary embodiment of an arrangement with the aid of which the method according to the invention can be carried out. Charge measuring devices 100, 103, 106 and 109 are connected to one another electrically in a chain-shaped structure by means of data lines 112. In this case, two charge measuring devices, specifically the charge measuring devices 100 and 109, are situated at the outer end of the chain, and two charge measuring devices, specifically the charge measuring devices 103 and 106, are situated in the interior of the chain.

The first internal charge measuring device 103 is connected with its measured value input E103a to a measured value output A100a of the charge measuring device 100 connected upstream of it. Connected downstream of the first internal charge measuring device 103 at its measured value output A103a is a measured value input E106a of the second internal charge measuring device 106 downstream of which, in turn, there is connected at its measured value output A106a a measured value input E109a of the second outlying charge measuring device 109. The second outlying charge measuring device 109 also has a measured value output A109b that is connected to a further measured value input E106b of the second internal charge measuring device 106. This second internal charge measuring device 106 is, moreover, connected with a further measured value output A106b to a further measured value input E103b of the first internal charge measuring device 103. This first internal charge measuring device 103 is also connected, with a further measured value output A103b, to a measured value input E10b of the first outlying charge measuring device 100.

There is also a further data line 115, specifically a duplex line, between the first outlying charge measuring device 100 and the second outlying charge measuring device 109.

Each of the charge measuring devices 100, 103, 106 and 109 is, moreover, respectively connected to one conductor end of the electric line 130 indicated schematically in FIG. 2—which has four conductor ends 120, 123, 126 and 129, and measures the charge QA', QB', QC' or QD' flowing through its conductor end, forming the measured charge values QA, QB, QC or QD in the process. In this case, the first outlying charge measuring device 100 measures the measured charge value or the measured charge values QA at the first conductor end 120, the first internal charge measuring device 103 measures the measured charge value or the measured charge values QB at the second conductor end 123, the second internal charge measuring device 106 measures the measured charge value or measured charge values QC at the third conductor end 126, and the second outlying charge measuring device 109 measures the measured charge value or measured charge values QD at the fourth conductor end 129.

The arrangement in accordance with FIG. 2 is operated as follows: the measured charge value QA measured with the aid of the first outlying charge measuring device 100 is transmitted to one measured value input E103a of the first internal charge measuring device 103 via the data line 112. Formed in the latter device from its own measured charge value QB and from the measured value QA of the first outlying charge measuring device 100 is an aggregate measured charge value QA+QB that is transmitted as measured value QA+QB to one measured value input E106a of the second internal charge measuring device 106. Formed in the second internal charge measuring device 106 from the measured value QA+QB and its own measured charge value QC is a new aggregate measured charge value QA+QB+QC that is transmitted as measured value to one measured value input E109a of the second outlying charge measuring device 109. A total current value QA+QB+QC+QD is formed in this charge measuring device 109 from the measured value QA+QB+QC and its own measured charge value QD. The charge measuring device 109 generates an error signal S for a fault current at a control output (not illustrated) when the total current value QA+QB+QC+QD exceeds the prescribed minimum threshold value $Q_{min}$ and the total system error $\Delta Q_{diff}$. The total system error is determined in this case exactly as was explained in conjunction with FIG. 1, specifically by taking account of the measuring errors ΔQA, ΔQB, . . . ΔQD of individual charge measuring instruments, as well as of the synchronization error occurring. Of course, in order to render this possible it is necessary also to transmit the corresponding measuring errors ΔQA, ΔQB, . . . ΔQD of individual charge measuring instruments, doing so in each case with the charge values QA, QB, . . . QD, as was explained in conjunction with FIG. 1. For reasons of clarity, the specification of the corresponding reference symbols ΔQA, ΔQB, . . . ΔQD was dispensed with in FIG. 2.

At the same time, the measured charge value QD of the second outlying charge measuring device 109 is transmitted as further measured value to the further measured value input E106b of the second internal charge measuring device 106. Thus, in the second internal charge measuring device 106 one measured value QA+QB of the first internal charge measuring device 103 is present at one measured value input E106a, and the further measured value QD is present at the further measured value input E106b. The total measured charge value QA+QB+QC+QD is formed in the charge measuring device 106 from the two measured values and its own measured charge value QC, and the error signal is formed as soon as the total measured charge value QA+QB+QC+QD exceeds the prescribed minimum threshold value $Q_{min}$ and the total system error $\Delta Q_{diff}$. The error signal S is then output at a control output (not illustrated). Also formed in the charge measuring device 106 from the further measured value QD present at the further measured value input E106b and its own measured charge value QC is a further, aggregate measured charge value QC+QD, which is output at the further measured value output A106b and transmitted to the first internal charge measuring device 103.

One measured value QA of the first outlying charge measuring device 100 is now present in the first internal charge measuring device 103 at one measured value input E103a, and the further measured value QC+QD is present at the further measured value input E103b. The total measured charge value QA+QB+QC+QD is formed in the charge measuring device 103 from the two measured values QA and QC+QD and its own measured charge value QB, and the error signal is formed as soon as the total measured charge value QA+QB+QC+QD exceeds the prescribed minimum threshold value $Q_{min}$ and the total system error $\Delta Q_{diff}$. The error signal S is then output at a control output (not illustrated). Moreover, there is formed in the charge measuring device 103 from the further measured value QC+QD, present at the further measured value input E103b, and its own measured charge value QB a further aggregate measured charge value QB+QC+QD that is output at the further measured value output A103b to the first outlying charge measuring device 100.

The measured value QB+QC+QD of the first internal charge measuring device 103 is now present at the measured value input E100b in the first outlying charge measuring device 100. The total measured charge value QA+QB+QC+QD is formed in the first outlying charge measuring device 100 from the measured value QB+QC+QD and its own measured charge value QA, and the error signal is formed as soon as the total charge value QA+QB+QC+QD exceeds the prescribed minimum threshold value $Q_{min}$ and the total system error $\Delta Q_{diff}$; the error signal S is then output at a control output (not illustrated).

Thus, there is transmitted to each of the charge measuring devices a measured value or two measured values with the aid of which each of the charge measuring devices is capable, using its own measured charge value, of determining the total measured charge value and generating the error signal.

The total measured charge value is transmitted in each case for control purposes via the further data line 115 between two outlying charge measuring devices 100 and 109. A check is made for this purpose in the two charge measuring devices as to whether the total measured charge value transmitted by the respective other outlying charge measuring device corresponds to its own total measured charge value. Should this not be the case, an alarm signal is generated that specifies a fault in the measuring arrangement. A further advantage of the further data line 115 includes the arrangement in accordance with FIG. 2 continuing to be operated even when a data line 112 between two adjacent charge measuring devices is interrupted, because in such a case the further data line 115 can be used as substitute for the interrupted data line 112.

The one and the further arithmetic unit can be formed, for example, by a DP system or by a microprocessor arrangement.

FIG. 3 shows an exemplary embodiment of a charge measuring device as it can be used in the arrangements in accordance with FIGS. 1 and 2. In this case, the explanation proceeds on the basis of the charge measuring device 103 in accordance with FIG. 2 and, for the sake of simplifying understanding of FIG. 3, the same reference numerals as in FIG. 2 are used in FIG. 3 for components already explained in conjunction with FIG. 2.

The charge measuring device 103 has one current input 1103a and a further current input 1103b, with the aid of which inputs the charge measuring device 103 is connected to the conductor end 123 of the line 130 in accordance with FIG. 2. Connected to the two current inputs 1103a and 1103b is a measuring unit 73 downstream of which there is arranged an adder 76 as arithmetic unit with an input E76a, a further adder 77 as further arithmetic unit with an input E77a, and a control unit 78 with an input E78a. The adder 76 is connected with a further input E76b to one measured value input E103a of the charge measuring device 103 and, with an output A76, to one measured value output A103a of the charge measuring device 103.

The further adder 77 is connected with a further input E77b to the further measured value input E103b of the charge measuring device 103 and, with an output A77, to the further measured value output A103b of the charge measuring device 103.

A further input E78b of the control unit 78 is connected with one measured value input E103a of the charge measuring device 103. An additional measured value input E78c of the control unit 78 is connected to the further measured value input E103b of the charge measuring device 103.

The measuring unit 73 is used to measure the current IB' at the conductor end 123 and to form a measured current value IB corresponding to the current IB'. The measured current values IB that are formed during a prescribed measuring period T or during a prescribed measuring window, are integrated in the measuring unit 73 with the formation of a measured charge value QB.

$$QB = \int_{t0}^{t1} IB(t)dt$$

(t0: start of measuring window, t1: end of measuring window).

Consequently, this measured charge value QB then specifies the charge QB' that has flowed through the conductor end 123 during the measuring period T=t1−t0.

Figure 4:
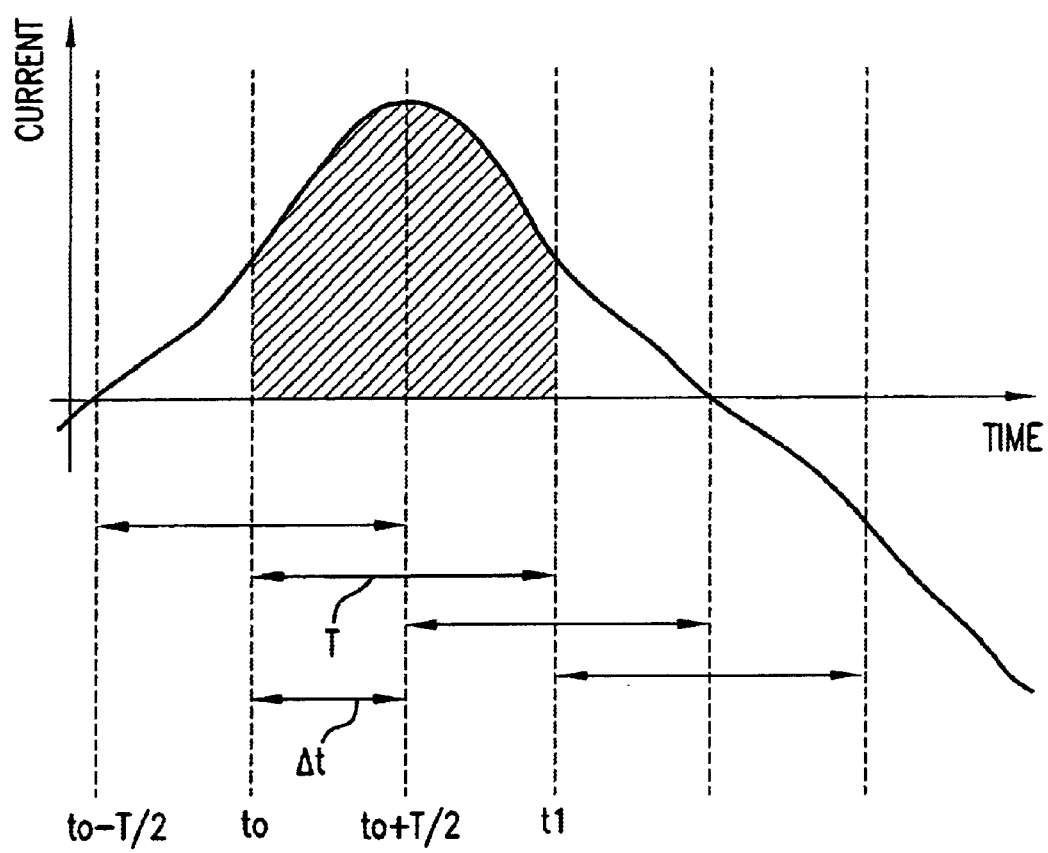
FIG. 4 shows measurement of current performed by the charge devices.

The measuring period T (see FIG. 4) or the length of the measuring window is in this case $$T = \frac{1}{f} \cdot \frac{1}{4} = 5 \text{ ms}$$

(50 Hz alternating current), f denoting the fundamental frequency of the alternating current IB' and being able, for example, to be 50 Hz or 60 Hz. The charge measurement is repeated cyclically in this case, the aim being for the measuring windows to overlap. Particularly good results are achieved in generating the error signal S when the measuring windows are displaced by, for example, ⅛ of the period of the alternating current IB' (=45° displacement). Thus, a 45° displacement of the measuring window is understood to mean that the respective next charge measurement is to be performed temporally in the middle of the respective preceding charge measurement:

$$QB(to) = \int_{to-T/2}^{to+T/2} IB(t)dt$$

(preceding measurement)

$$QB(to + \Delta t) = \int_{to}^{to+T} IB(t)dt$$

(respective next measurement),

Δt denoting the time offset of the measuring windows, and T denoting the length of the measuring windows; it is therefore to hold that:

$$\Delta t = \frac{T}{2} = 2.5 \text{ ms (at 50 Hz)}.$$

This measured charge value QB thus formed also passes to the arithmetic unit 76 in which from this and one measured charge value QA at one measured value input E103a an aggregate measured charge value QA+QB is formed, and the latter is transmitted as measured value to one measured value output A103a of the charge measuring device 103.

The measured charge value QB thus formed passes to the further arithmetic unit 77, in which a further aggregate measured charge value QB+QC+QD is formed from the further measured value QC+QD at the further measured value input E103b of the charge measuring device 103 and from the measured charge value QB, and is output as measured value at the further measured value output A103b of the charge measuring device 103.

Furthermore, the measured charge value QB is transmitted to the control unit 78 in which a total measured charge value QA+QB+QC+QD is formed from its own measured charge value QB, one measured value QA and the further measured value QC+QD.

This total measured charge value QA+ . . . +QD is compared in the control unit 78 with a threshold value adapted to the measuring situation. If the total measured charge value exceeds this threshold value, there is output at a control signal output S103 of the current measuring device 103 a signal S that marks a fault current in the line 130. How the comparison with the threshold value is carried out in detail will be described below:

Also formed in the measuring unit 73 is the measuring error ΔQB of the charge measuring device 103, this being done in accordance with:

$$\Delta QB = k_B \cdot T \cdot \frac{\text{MAX}}{\text{measuring interval } T} \left[ \frac{|IB|}{I_{nominal}} \right] + \Delta Q_{\substack{integration \\ error\ of\ the \\ charge \\ measuring\ device \\ 103}}$$

$k_B$ (typically=0.2) specifying the measuring inaccuracy or measuring tolerance of the charge measuring device 103. T is 5 ms, and $I_{nominal}$ is a prescribed nominal current that is prescribed through the conductor 6. The integration error is a function of the type of integration method and is dependent on the measured current values IB.

The measuring error ΔQB passes to the arithmetic unit 76 in which it is added to the measuring error ΔQA present on the input side. The measuring error sum ΔQA+ΔQB is output at the measured value output Δ103a of the charge measuring device 103.

The measuring error ΔQB also passes to the further adder 77, in which the aggregate measured value ΔQC+ΔQD from the measured value input E103B is added to the measuring error ΔQB. The aggregate measured value ΔQB+ΔQC+ΔQD is output at the further measured value output Δ103b of the charge measuring device 103. Moreover, the measuring error ΔQB passes to the control unit 78 in which a total measuring error ΔQA+ . . . +ΔQD is formed by summing the measuring errors ΔQA, ΔQB, ΔQC and ΔQD present there on the input side.

The total system error $\Delta Q_{diff}$ is then formed in the control unit 78 with the aid of this total measuring error, in accordance with:

$$\Delta Q_{diff} = \Delta QA + \ldots \Delta QD + \sum_{all\ connections} \Delta Q diff_{synchronization},$$

$$\sum_{all\ connections} QQ dif_{synchronization}$$

being a variable that is permanently stored in the control unit 78 and specifies the error caused by defective synchronization between the charge measuring units.

$$\sum_{all\ connections} QQ dif_{synchronization}$$

can, however, also be formed in the control unit 78 as follows:

$$\sum_{all\ connections} QQ dif_{synchronization} = k_{sync} \cdot \Delta T_{sync} \cdot (\Delta QA + \ldots + \Delta QD)$$

$\Delta T_{synch}$ denoting the estimated maximum temporal synchronization error, stored in the control unit 78, between the individual clock signals $T_A$, and $k_{sync}$ being a factor that can be calculated, for example, as follows:

$$k_{sync} = \frac{1}{T \cdot \text{Min(measuring inaccuracies of all participating charge measuring instruments}}$$

If T=5 ms and the minimal measuring inaccuracy (measuring tolerance) of the participating charge measuring devices (reference numerals 30, 33, 36, 39 and 42 in FIG. 1 and reference numerals 100, 103, 106 and 109 in FIG. 2) is 0.2, it follows that $k_{sync}$ is 1000 1/s.

The error signal S is subsequently formed when the total measured charge value QA+ . . . QD is greater than the permanently prescribed minimum threshold $Q_{min}$ and greater than the total system error ΔQdiff.

The current measuring device 103 also has a terminal Q1 that is connected to the control unit 78. If the current measuring device 103 is to be operated as an outlying current measuring device 100 or 109 in accordance with FIG. 2, the current measuring device can be connected via this terminal Q1 to the respective other outlying current measuring device via the further data line 115 for transmitting the total charge value QA+ . . . +QD. A comparison is then made in the control unit 78 as to whether its own total charge value is equal to the transmitted total measured charge value of the other outlying current measuring device. Should this not be the case, there is output at a further terminal Q2 an alarm signal A which specifies that a fault has occurred in the measuring arrangement.

The current measuring device 103 has a clock input T103 with the aid of which it is connected to a clock generator 200. The formation of the measured current values IB and the measured charge values QB is therefore performed synchronously in time with the remaining charge measuring devices in accordance with FIGS. 1 and 2. The clock synchronization can also be performed in another way via the data lines, for example via data lines as described in the printed publication mentioned at the beginning (for example ping-pong method).

The one and the further arithmetic units 76 and 77 as well as the control unit 78 can be formed by a dp system, for example a microprocessor arrangement.

What is claimed is:

1. A method for generating an error signal that characterizes a fault current in an electric conductor which has an alternating current, comprising:

measuring measured charge values that specify a charge quantity flowing through a respective conductor end during a prescribed measuring period;

forming a total measured charge value by addition using the measured charge values taking account of the direction of the flow of charge; and generating the error signal when the total measured charge value exceeds an absolute threshold value set as a function of the accuracy of the respective charge measuring devices, wherein the measurement of the measured charge values is carried out in a time-synchronized fashion and is repeated regularly such that the time interval between two sequential measurements is smaller in each case than the prescribed measuring period.

2. The method as claimed in claim 1, wherein the prescribed measuring period is dimensioned such that it is shorter than half the cycle length of the current.

3. The method as claimed in claim 2, wherein the prescribed measuring period corresponds approximately to a quarter of the cycle length of the current.

4. The method as claimed in claim 1, wherein the time interval between two sequential measurements is approximately half as long as the prescribed measuring period.

5. The method as claimed in claim 1, further comprising:

transmitting to a selected charge measuring device an intermediate value that is formed by addition in advance of the measured charge values of the remaining charge measuring devices; and forming the total measured charge value by addition using the measured charge value of the selected charge measuring device and using the intermediate value.

6. The method as claimed in claim 1, further comprising:

transmitting two intermediate values to the selected charge measuring device, including forming a first intermediate value by addition from the measured charge values (QB+QC) of a first group of the remaining charge measuring devices;

forming a second intermediate value by addition from the measured charge values of a second group of the remaining charge measuring devices, the second group including charge measuring devices except a selected charge measuring device and charge measuring devices of the first group; and forming the total measured charge value by addition using the measured charge value of the selected charge measuring device and two intermediate values.

7. The method as claimed in claim 6, wherein the current in the respective conductor end is measured using the charge measuring devices by forming measured current values, and the measured charge values are formed by integrating the measured current values.

8. The method as claimed in claim 7, wherein the measured current values are formed by sampling and A/D conversion, and the integration is performed in a digital computer by digital summation.

* * * * *